Nov. 18, 1952     H. A. NEUMAN     2,618,294
CONTROL MECHANISM
Filed Sept. 19, 1951                2 SHEETS—SHEET 1
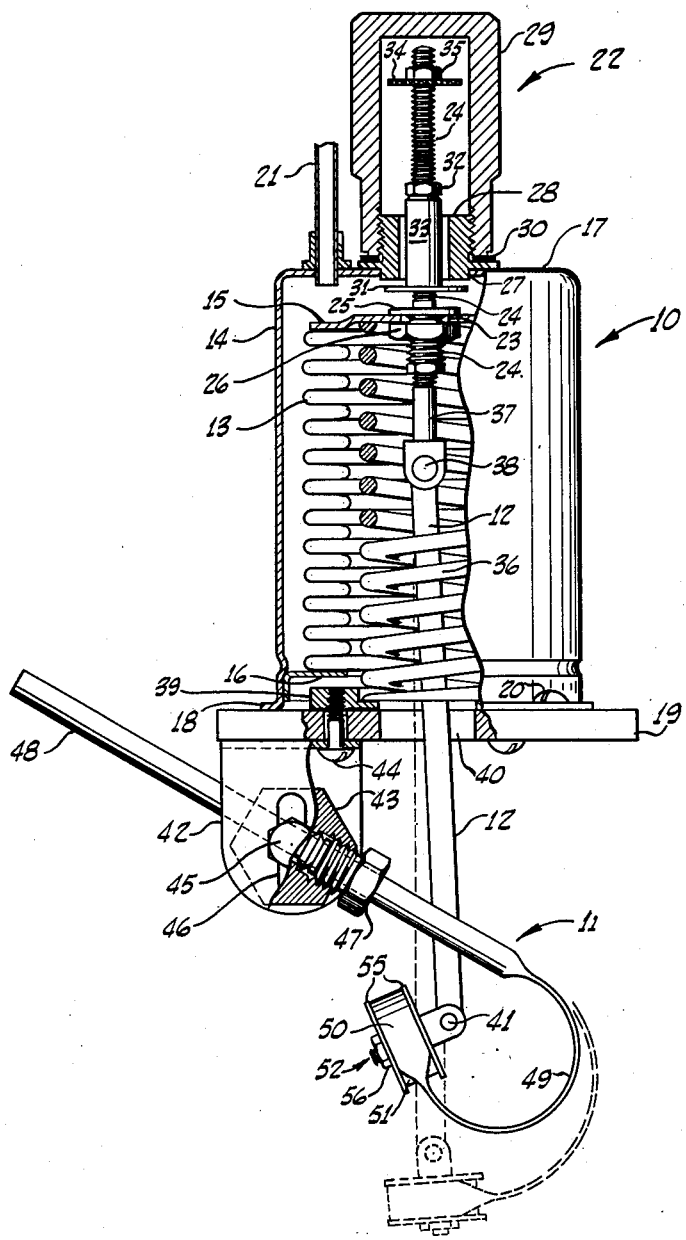
Fig. I
INVENTOR.
HERBERT A. NEUMAN
BY
Curtis, Morris & Safford
ATTORNEYS.

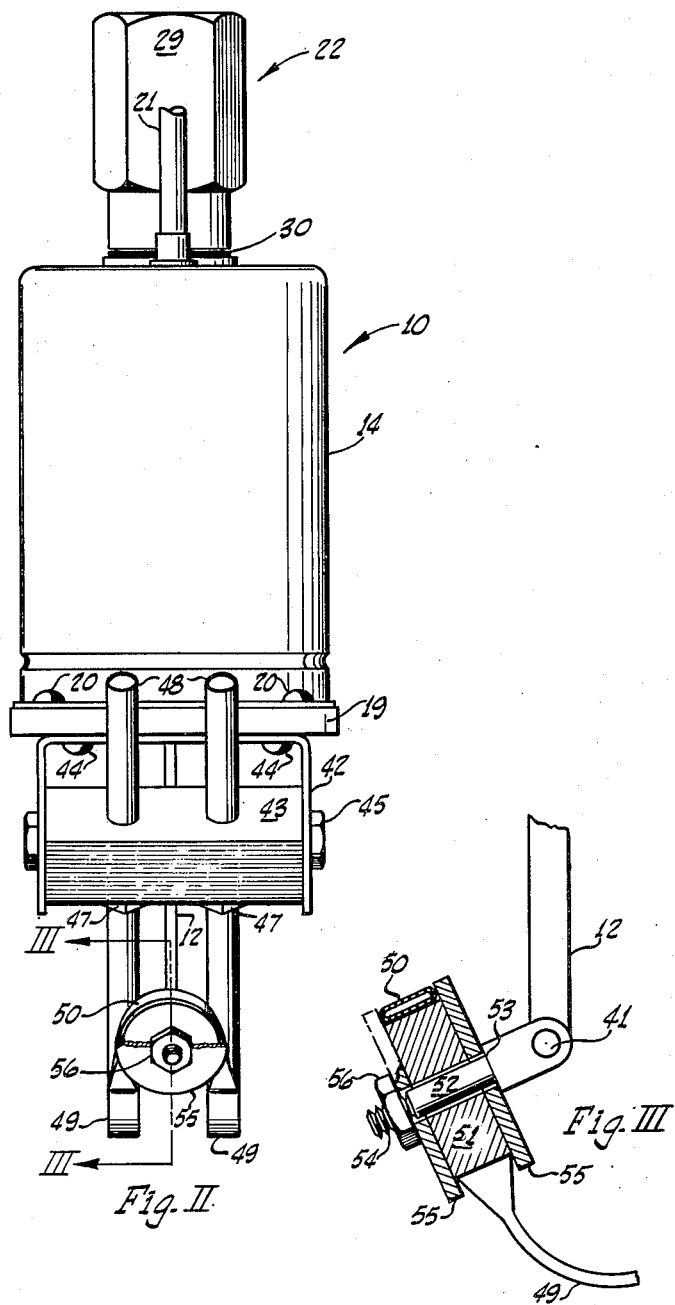

Patented Nov. 18, 1952

2,618,294

UNITED STATES PATENT OFFICE 2,618,294

CONTROL MECHANISM

Herbert A. Neuman, Wrentham, Mass., assignor to The Foxboro Company, Foxboro, Mass., a corporation of Massachusetts Application September 19, 1951, Serial No. 247,275

2 Claims. (Cl. 138—45)

This invention relates to apparatus for providing a variable restriction to the flow of fluid in or in association with automatic controllers, and more particularly to restriction apparatus of particular configuration and operation.

It is an object of this invention to provide new and improved fluid flow variable restriction apparatus.

It is another object of this invention to provide fluid flow variable restriction apparatus with a Bourdon type tube of new and improved configuration.

It is a further object of this invention to provide fluid flow variable restriction apparatus with automatic control of restriction to fluid flow in a Bourdon type tube.

These and other objects of the invention will be in part pointed out and will be in part obvious from the text.

This invention, accordingly, consists of the features of construction, combinations of elements, and arrangements of parts as will be exemplified in the structure to be hereinafter more fully described and the scope of the application of which will be set forth in the accompanying claims:

In the accompanying drawings:

Figure I is a front elevation, in partial vertical section, of a structure embodying this invention;

Figure II is a side elevation of the structure of Figure I; and

Figure III is a vertical central section of a portion of the structure of Figures I and II, taken as on line III—III in Figure II.

The invention in its preferred form makes use of an arcuately shaped restrictor with curved portions resembling sections cut from ordinary Bourdon tubing. Variations in the restricting effect upon fluid flow therethrough may be brought about by increasing or decreasing the radius of curvature of one or more of such curved portions. Thus, decreasing the radius of curvature decreases the cross-sectional area of the passage through the tubing, and vice versa. As the tubing is bent more and more in a radius decreasing direction, the flow of fluid through it, for a given pressure drop across the tubing, may be very nearly reduced to zero. As the tubing is unbent, the same pressure drop will produce a larger fluid flow because the resistance to fluid flow therethrough is reduced.

It has been discovered that the relationship between the amount of bend in the tube and the flow through it is a proportional one. The tube, in being bent, is allowed to follow its natural arcuate path, as it would if moved by internal pressures, assuming it to be otherwise free to bend and unbend. Thus, for any given arrangement of parts and pressure drop, each unit of bending movement will produce a proportionally related change in the fluid flow through the tube. This proportion may be varied by adjustment as will be explained later herein.

This invention provides means for automatically bending the Bourdon type tubing in response to a control signal as an automatic control of fluid flow through the tube. The device is a throttling type of valve with small capacity. As an example, it can handle 2.5 cc. per minute of water under pressure drop of 2.5 to 7.5 p. s. i.

Referring to the drawings, as in Figures I and II as an illustrative embodiment of this invention, the device comprises generally, a bellows unit 10 and a Bourdon type restrictor tube 11, operatively connected by a link 12. The bellows unit 10 comprises a generally cylindrical bellows 13 with a cylindrical cover can 14 containing the bellows. The bellows has a closed, movable end 15 and an open, fixed end 16. The can 14 also has a closed end, 17, and an open end, 18. The can and bellows are assembled on the same cylindrical axis, with the closed ends adjacent each other and the open ends secured to each other in pneumatically sealed relation. Thus a pneumatic pressure chamber is provided outside the bellows and within the can, and this assembly of bellows 13 and cover can 14 is rigidly mounted on a support plate 19 by means of screws 20.

The closed end of the cover can 14 is provided with a pneumatic signal input pipe 21. Pneumatic signals are applied to the bellows 13 through this pipe 21 from any suitable control source, to automatically move the bellows in representation of the input pneumatic signals. The bellows movement is limited by a motion stop assembly, generally indicated at 22. The movable end 15 of the bellows has an opening 23 therethrough which is closed off by a threaded member 24 extending therethrough. The bellows end 15 is clamped between a shoulder 25 on the member 24, and a nut 26 threaded on the member 24 inside the bellows. The threaded member 24 extends out through an opening 27 in the end 17 of the cover can 14. Secured in the opening 27 in pneumatic seal relation therewith is a cylindrical sleeve 28 as a stop for bellows motion. The inner diameter of this sleeve is sufficient to provide a substantial clearance for the threaded member 24. Threaded on the stop sleeve 28, outside the can 14, is a hollow cover nut 29 which encloses the outer portion of the threaded member 24. The cover nut 29 bears on a pneumatic sealing washer 30 so that the threaded member 24, where it is outside of the bellows 13, is wholly enclosed within the can 14 and its adjunct, the hollow cover nut 29.

Within the can 14 and threaded on the threaded member 24, there is located a stop washer 31 which is of greater diameter than the inner diameter of the stop sleeve 28. As the washer 31 engages the bottom of the stop sleeve 28 it defines the upper limit of travel of the bellows end 15. The washer 31 is adjustably locked in place by a nut 32 which bears on a spacer sleeve 33 extending through the stop sleeve 28.

Within the cover nut 29 and threaded on the threaded member 24, there is located a stop washer 34, also of greater diameter than the inner diameter of the stop sleeve 28. As this washer engages the top of the stop sleeve 28 it defines the lower limit of travel of the bellows end 15. The washer 34 is adjustably locked in place by a nut 35.

Within the bellows 13 there is a helical loading spring 36, as is customary in pneumatic control bellows arrangements of this type. The upper end of this spring engages the upper, closed end 15 of the bellows and the lower end of the spring engages the support plate 19. This lower end is held in place laterally by a ring 39, secured to the support plate. Also within the bellows and threadedly mounted adjacent the closed end thereof on the threaded member 24 is a connection pin 37. At the lower end of this pin, the link 12 is mounted for pivotal movement about a horizontal axis represented by a screw 38.

As mentioned briefly hereinbefore, the bellows 13 and the restrictor tube 11 are connected by the link 12. This link extends from within the bellows at its pivot 38, downward through the open end 16 of the bellows and through the mounting plate 19 by way of an opening 40 therein, to its connection with the restrictor tube 11 in the form of a pivot pin 41. The pin 41 also provides a horizontal pivot, parallel to the pivot of screw 38 at the other end of the link.

The restriction tube 11 is supported from the support plate 19 by means of a U bracket 42 and a hexagonal bar 43. The hexagonal shape is merely for convenience in manufacture and handling. The U bracket 42 has its base secured by screws 44 to the under side of the support plate with the U legs depending from the support plate 19 and perpendicular to the axes of the link pivots 38 and 41. The hexagonal bar 43 extends axially between the depending U legs, and is mounted thereon for pivotal adjustment and bodily adjustment as provided for by mounting bolts 45 and adjustment slots 46. The purpose of these adjustments will be explained later herein.

The restrictor tube 11 is mounted in the hexagonal bar 43, being extended through openings therein and secured in the openings by clamp nuts 47, screwed into the hexagonal bar.

Reference to Figures I, II, and III of the drawing will show the configuration of the restrictor tube 11. It is a one piece Bourdon type tube having portions of full round cross section and portions of flattened, Bourdon-like cross section. The tube is bent in the form of a double hook with the hooks lying side by side, and parallel to each other. The ends 48 of the tube form the shanks of the hooks, straight, parallel, adjacent, and of equal length. These ends 48 extend at an angle upwardly through the hexagonal bar 43, and are supported thereby. In the lower portions of the tube the hooks have curved portions 49, flattened in Bourdon tube fashion with the curved portions adjacent, parallel, of equal extent and lying edge to edge in curves of the same radius. The flattened surfaces define, generally, a cylinder, the longitudinal axis of which is parallel to the pivot axes of the link pivots 38 and 41. These curved, flattened portions 49 are joined by that portion of the tube, as at 50 which is central in terms of the length of the tube. This central portion 50 is also flattened and curved; it being flattened, in terms of angular relation about the longitudinal axis of the tube, at right angles to the flattening of the portions 49. The flattened surfaces define, generally, a cylinder, the longitudinal axis of which is perpendicular to the pivot axis of the link pivot 41.

The restrictor tube central portion 50 is mounted, see Figure III, on the periphery of a support disc 51. A support pin 52 extends from the link pivot 41 through the support disc 51, with an inner shoulder 53 and an outer threaded portion 54. A holding disc 55 is provided on each side of the support disc 51, the holding discs being of greater diameter than the support disc so as to clamp the restrictor tube therebetween. The support disc is made slightly less in thickness than the width of the flattened restrictor tube, and nut 56 on the pin 52 clamps the disc and tube assembly against the pin shoulder 53.

Thus, with the restrictor tube 11 held in an adjusted position in the hexagonal bar 43, a downward movement of the bellows 13 moves the link 12 downward to increase the radius of the restrictor tube curved portions 49. This is indicated in Figure I, by the dotted line showing of the restrictor tube. Such a downward movement opens the tube to greater flow, in proportion to the pneumatic control signal and the movement of the bellows.

The restrictor tube 11 is of one piece structure, so there are no dissimilar metals to be encountered by a fluid flow therethrough. Undesirable chemical effects occur on occasion where the fluid reacts with the different materials. The bending curves 49 are movable in planes parallel to the free movement plane of the link 12, that is, perpendicular to the pivots 38 and 41. Therefore vertical movement of the link 12 will bend or unbend the restrictor tube, but it follows its natural path of curvature unguided and unhampered by the link 12. The restrictor follows a bending path as if actuated by internal pressures in a Bourdon type of action, and otherwise free to bend or unbend. It has been found that this action provides proportional relation between the tube bend and the flow therethrough.

The curved portions 49 of the restrictor are parallel and identical, and close together, so they bend together and alike. The flattening of the joining portion 50 is a means of getting a short radius curve so that the portions 49 may be close together without undue restriction or angular passage in the joining portion. It also makes possible the one piece structure of the restrictor tube 11.

Adjustments are provided for the restrictor tube 11 so that changes may be made in the proportional relation between a movement of the bellows 13 and the responsive amount of bend in the restrictor. Also, with a particular proportional arrangement established, adjustment may be made to vary the zero, or desired starting point of the tube bending action. It will be seen that for any given curve form in the tube as at 49, a change in the angular relation between the link 12 and the restrictor tube 11 will provide a new proportional relation. Also, for any given angular relation between the link 12 and the restrictor tube 11, a change in the curves 49 will change the zero, or starting point of the tube bending action.

These adjustments, within the structural and dimensional limits of the device, may be accomplished by one or more of the adjustments, singly or in combination, as is convenient, desirable, or necessary. The adjustments are: moving the tube 11 in and out of the hexagonal bar 43, pivoting the hexagonal bar, and bodily moving the hexagonal bar along the slots 46 in the U legs 42. This bodily movement of the bar 43 and the tube length adjustment are essentially zeroing adjustments, and the pivoting of the bar 43 is essentially a proportion adjustment.

This invention, therefore, provides apparatus for providing a variable restriction to the flow of fluid in or in association with automatic controllers, with particular reference to restriction apparatus of particular configuration and operation.

As many possible embodiments may be made of the above invention and as changes may be made in the embodiment described without departing from the scope thereof, it is to be understood that all matter herein set forth or shown in the accompanying drawings is to be interpreted as illustrative and not in a limiting sense.

I claim:

1. A pneumatic flow control unit comprising an arcuately bent restrictor tube open to fluid flow at both ends, a bellows, movable in response to a pneumatic signal, and a mechanical connection between said tube and said bellows to translate said bellows movement into bending movement in said tube to vary the restriction thereof as a control of fluid flow therethrough.

2. In a pneumatic control unit, a fluid flow restrictor of Bourdon type tubing, said restrictor being bent in a double hook configuration, with the ends of the tube forming the shanks of the hooks, the curved portions of the hooks providing duplicate curved and flattened metering sections in the tube, and an intermediate section of the tube joining said metering sections and being flattened at right angles to the flattening of said metering sections, a bellows, movable in response to a pneumatic signal, and a mechanical connection between said tube and said bellows to translate said bellows movement into bending movement in said tube independently of fluid pressure therein, to vary the restriction of said tube as a control of fluid flow therethrough.

HERBERT A. NEUMAN.

REFERENCES CITED

The following references are of record in the file of this patent:

UNITED STATES PATENTS

| Number | Name | Date |
|---|---|---|
| 2,422,921 | Nier et al. | June 24, 1947 |
| 2,432,082 | Bilyeu | Dec. 9, 1947 |